US005671163A

United States Patent [19]

Iida

[11] Patent Number: 5,671,163

[45] Date of Patent: Sep. 23, 1997

[54] PAPER FEED CONTROL SYSTEM IN PRINTING UNIT

[75] Inventor: Kazuhiko Iida, Nagano, Japan

[73] Assignee: Seiko Epson Corporation, Tokyo, Japan

[21] Appl. No.: 493,393

[22] Filed: Jun. 21, 1995

[30] Foreign Application Priority Data

| | | | |
|---|---|---|---|
| Jun. 21, 1994 | [JP] | Japan | 6-138918 |
| Jun. 21, 1994 | [JP] | Japan | 6-138919 |

[51] Int. Cl.[6] G01B 21/00; G03G 21/00

[52] U.S. Cl. 364/562; 399/45; 399/71; 399/343

[58] Field of Search 355/218, 311; 364/478, 550, 562, 478.01, 478.16; 399/34, 45, 71, 343

[56] References Cited

U.S. PATENT DOCUMENTS

| | | | |
|---|---|---|---|
| 4,365,885 | 12/1982 | Nishikawa | 355/218 |
| 4,456,673 | 6/1984 | Shigemura et al. | 430/125 |
| 4,740,810 | 4/1988 | Ito | 355/218 X |
| 4,752,809 | 6/1988 | Ito | 355/218 |
| 5,084,760 | 1/1992 | Hashimoto et al. | 355/311 X |
| 5,237,379 | 8/1993 | Sklut et al. | 355/311 |
| 5,464,204 | 11/1995 | Suzuki | 271/110 |
| 5,481,375 | 1/1996 | Eto et al. | 358/450 |
| 5,528,350 | 6/1996 | Tanaka et al. | 355/311 X |

FOREIGN PATENT DOCUMENTS

| | | |
|---|---|---|
| 0 061 265 | 9/1982 | European Pat. Off. . |
| 0 461 610 | 12/1991 | European Pat. Off. . |
| 63-74672 | 4/1988 | Japan . |
| 02 088 280 | 3/1990 | Japan . |
| 2-150376 | 6/1990 | Japan . |

*Primary Examiner*—Edward R. Cosimano
*Attorney, Agent, or Firm*—Sughrue, Mion, Zinn, Macpeak & Seas, PLLC

[57] ABSTRACT

In a page printer (3), a controller (7) calculates the length of paper from a paper size specified by a host computer (1) and notifies a printing portion (11) of the calculated paper length, and the printing portion (11) executes the feeding of paper (13) which is set based on the assumption that the paper (13) has the paper length notified by the controller (7). The printing portion (11) measures the actual length of the paper (13) during the paper feeding and notifies the controller (7) of the measured actual paper length, while the controller (7) judges in accordance with the actual paper length notified by the printing portion (11) whether there is present a paper size error. If it is found that the paper size error is present, then the controller (7) assumes the actual width of the paper (13) from the actual paper length of the paper (13), and then compares the actual length and width of the paper (13) with the greatest length and width of a printed image. Only when the comparison results show that the paper (13) is smaller than the printed image in at least one of the length and width thereof, the controller (7) instructs the printing portion (11) to allow for the cleaning of a transfer drum (19).

6 Claims, 3 Drawing Sheets

PAPER FEED CONTROL SYSTEM IN PRINTING UNIT

BACKGROUND OF THE INVENTION

1. Field of the Invention

The present invention generally relates to a control system for controlling the feeding of paper in a printing unit such as a page printer or the like using a single sheet of paper and, in particular, to an improved technique for judging the size of the paper set in the printing unit and feeding only the paper of the correct size. The present invention also relates to a cleaning control system in a page printer for cleaning a transfer mechanism when a paper size error occurs in the page printer.

2. Description of Related Art

A printing unit, in general, comprises a controller for receiving data from a host computer to produce bit map data of an image to be printed and a printing portion for inputting the image bit map data from the controller to print the same on paper.

In a conventional page printer which does not include a paper size sensor, in order to check whether the paper set is the paper of a specified size, two kinds of systems are employed as follows.

In one system (for example, which is disclosed in Japanese Patent Publication No. 63-74672), immediately after the power supply is actuated or when the first sheet of paper is fed from a state in which no paper is present in the printing portion (which is hereinafter referred to as paper empty state), the printing portion calculates the length of the paper in the feeding direction thereof in accordance with a signal transmitted from a paper sensor and the feeding speed thereof, checks which paper size (such as A4, B5, letter size and the like), previously programmed in the printing portion, the calculated length corresponds to, and then notifies the controller of the corresponding size of the paper. Also, if the length of the paper does not correspond to any one of the previously determined sizes or standard sizes, then the printing portion judges that a paper size error has occurred, and thus the printing portion stops its current printing operation and cleans the transfer drum.

In the other system, the controller notifies the printing portion of the paper size specified by the host computer in the form of the standard sizes (such as A4, B5, letter size and the like) immediately after the power supply is turned on or when the first sheet of paper is fed from the paper empty state, measures the length of the paper in the feeding direction thereof to judge to which of the standard sizes the measured size corresponds, and notifies the controller of the measured paper size. In response to this, the controller compares the size specified by the host computer with the size notified from the printing portion and, if they are different from each other, then the controller judges it as a paper size error and thus instructs the printing portion to clean the transfer drum.

In the above-mentioned conventional techniques, however, there are still left several problems to be solved. Firstly, since the printing portion performs the paper size processing on the basis of the standard sizes and the standard sizes vary according to the types of printing units, it is necessary to change an interface (that is, a video interface) interposed between the controller and printing portion according to the types of the printing units.

Secondly, when a paper size other than the standard sizes is specified, the paper feeding speed is controlled on the basis of the standard size that is approximate to the specified paper size, so that the paper feeding control can be inaccurate.

Thirdly, since the paper size is determined on the basis of the measured value of the length of the first sheet of paper, if the measurement of the length of the first sheet of paper is not completed, that is, until the first sheet of paper has passed completely through the paper sensor, then the feeding of the second sheet of paper cannot be started. This makes it difficult to increase the number of printed sheets of paper, that is, the printing speed of the sheets of paper per unit time cannot be increased.

Fourthly, when the first sheet of paper is fed, since the actual paper size of the first sheet of paper is not known, the upper limit value of the paper feeding time for detection of the jammed paper must be set to the largest size of the paper that can be used. For this reason, when the first sheet of paper is jammed, the detection of such jamming is delayed and thus the stop of the printing portion is delayed, which can easily cause the printing portion to break down.

Further, in the conventional printing unit using a transfer drum such as a page printer or the like, the transfer drum is always cleaned each time the paper size error occurs. The reason for this is that if the paper size is wrong, a toner attached to the area of the drum surface existing beyond the paper is transferred not to the paper but to a transfer roller, so that the toner on the transfer roller will be attached to the back surface of the next page to thereby dirty the same back surface.

In fact, however, even when the paper size is wrong, so long as the printing image formed on the drum does not spread beyond the paper, no cleaning is necessary. In spite of this, in the conventional printer, because cleaning is always carried out each time a paper size error occurs, there is a possibility that the transfer roller is cleaned wastefully, thereby decreasing the printing speed as a whole. Especially, when the paper is fed manually, there is a possibility that a different paper length can be measured each time a sheet of paper is fed, with the result that a paper size error and transfer roller cleaning occur for each sheet of paper to thereby lower the image printing speed excessively.

SUMMARY OF THE INVENTION

The present invention aims at eliminating the drawbacks found in the above-mentioned paper feed control system employed in the conventional printing unit. Accordingly, it is a first main object of the invention to provide a paper feed control system for use in a printing unit in which, even if a usable paper size is changed in any way, there is no need to change a video interface.

It is a secondary object of the invention to provide a paper feed control system which is able to control the paper feeding accurately even if any paper size is specified.

It is another secondary object of the invention to provide a paper feed control system which can increase the number of printed sheets per unit time.

It is still another secondary object of the invention to provide a paper feed control system which can eliminate the possibility that paper jamming detection can be delayed with respect to the first sheet of paper.

Also, it is a second main object of the invention to provide a paper feed control system in which, when a paper size error occurs in a page printer, a transfer roller can be cleaned only when cleaning is really necessary, thereby preventing the printing speed from being lowered by wasteful cleaning.

In a paper feed control system according to the invention, a controller calculates the length of the paper from a specified paper size, and notifies a printing portion of the paper length, not the specific paper size. The printing portion assumes that the paper actually has the paper length notified by the controller, before it executes the paper feeding operation.

In this manner, in the present paper feed control system, since the paper length is notified to the printing portion and the printing portion controls the paper feeding operation in accordance with the notified paper length, it is not necessary for the printing portion to be conscious of the standard size of the paper and, therefore, even if a usable standard size varies according to the types of printing units, a common video interface can be used. Also, whether the specified paper size is standard or non-standard, the printing portion is able to control the paper feeding operation with accuracy.

Also, since the printing portion feeds the paper based on the assumption that the actual paper has the paper length notified by the controller, the printing portion can start to feed the paper from the first paper at the greatest rate appropriate for the notified paper length, and is also able to set the upper limit time for the paper jamming detection to a value corresponding to the notified paper length. As it is very rare, in fact, that the paper set has a different size from the specified size, in most cases, the present invention is able to increase the number of printed sheets per unit time and, when any paper jamming occurs, is able to stop the printing portion quickly. On the other hand, if there is set a paper having the wrong size, then the paper feeding rate and the upper limit time for the paper jamming detection are not suitable for the actual paper size. However, in this case, at any rate, it is necessary to consider this case as a paper size error and thus to reset paper having a correct size. This means that, practically, such case does not provide any special problems.

In a preferred embodiment of the invention, while feeding the paper, the printing portion measures the actual length of the paper, and the controller judges in accordance with the actual paper length notified by the printing portion whether a paper size error is present or not.

In this preferred embodiment, the controller is able to decide whether the printing portion should be stopped when any paper size error occurs. Accordingly, various specifications such as (1) a specification in which printing is to be continued without stopping the printing portion, even if any paper size error occurs; (2) a specification in which the printing portion is stopped when an actual paper size is smaller than the specified size, but printing is to be continued without stopping the printing portion when the actual paper size is larger than the specified size; and (3) a specification in which the printing portion should be always stopped whenever the paper size error occurs, can be realized in a simple manner only by changing the design of only the controller and without changing the design of the video interface and printing portion.

Also, a cleaning control method according to the invention comprises: means for calculating the greatest length and greatest width on paper of the printing image that is formed in the transfer mechanism; means for determining the length and width of paper with a printed image formed thereon; means for comparing the greatest length and width of the printing image with the length and width of the paper to thereby judge whether the printed image extends beyond the paper or not; and, means for cleaning the transfer mechanism only when the judge means judges that the printed image extends beyond the paper.

Here, the length and width of the paper can be both measured but, alternatively, only the length of the paper may be measured and, the width of the paper may be assumed from the measured paper length.

Also, in an ordinary page printer, the paper size error is normally detected. However, the judgment whether the printed image extends beyond the paper can be made only when the paper size error is detected and can be omitted when a paper size error is not detected. This can eliminate the need for the above-mentioned judgment at each page and thus can relieve the processing burden of the page printer.

Further, according to the present cleaning control method, cleaning is carried out only when the printed image extends beyond the paper, whereas no cleaning is performed if the printed image does not extend beyond the paper. For this reason, even if the paper size error occurs, cleaning is not carried unnecessarily, which contributes to an improvement in the printing speed.

DETAILED DESCRIPTION OF THE PREFERRED EMBODIMENT

Figure 1:
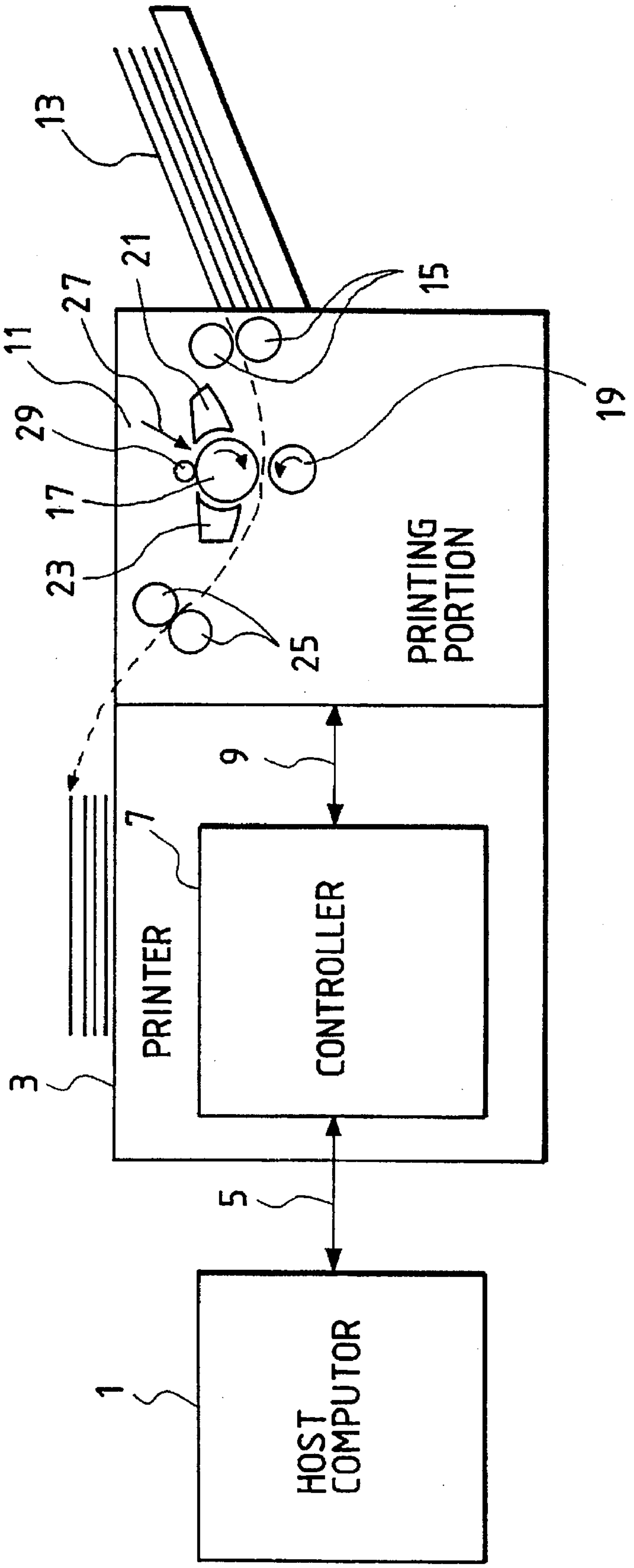
FIG. 1 is a block diagram of a general structure of an embodiment of a page printer to which the invention is applied.

FIG. 1 illustrates a general structure of an embodiment of a page printer to which a paper feeding system according to the invention is applied.

In FIG. 1, a printer 3 is connected to a host computer 1 (which is hereinafter referred to simply as a host), and receives from the host 1 data on an image to be printed and various control instructions. The printer 3 has an interface 5 with respect to the host 1, and the interface 5 is generally referred to as a host interface.

The interior structure of the printer 3 can be mainly divided into two parts, that is, a controller 7 and a printing portion 11. An interface 9 interposed between the controller 7 and printing portion 11 is generally referred to as a video interface.

The controller 7 is a programmed microcomputer. One of the two main functions of the controller 7 is to interpret data received from the host 1 to produce bit map data on the image to be printed, and the other is to control the timing of a printing operation to be performed by the printing portion 11.

The printing portion 11 comprises a mechanism 15 for feeding paper 13, a drum 17, a transfer roller 19, a developing device 21, a cleaner 23, a fixing roller 25, a laser beam 27, a charging roller 29 and the like. Under the timing control by the controller 7, the printing portion 11 receives the bit map data of the image from the controller 7, feeds the paper 13, prints the image on the paper 13, and discharges the paper 13 with the image printed thereon.

Also, in cleaning, the printing portion 11 applies a voltage to the transfer roller 19 having an opposite polarity to a voltage applied during printing to thereby cause a toner attached to the transfer roller 19 to return back to the drum 17, and removes the toner by use of the cleaner 23.

The size of the paper 13 usable in the present page printer can be freely selected within the range that can be permitted by mechanical restraints. That is, there can be used not only paper having a standard size to be specified by a given size number such A4, B5 or the like, but also paper having an arbitrary size expressed in millimeters or inches. The size of the paper to be used can be specified from a control panel (not shown) provided in the printer 3 or from the host 1.

Figure 2:
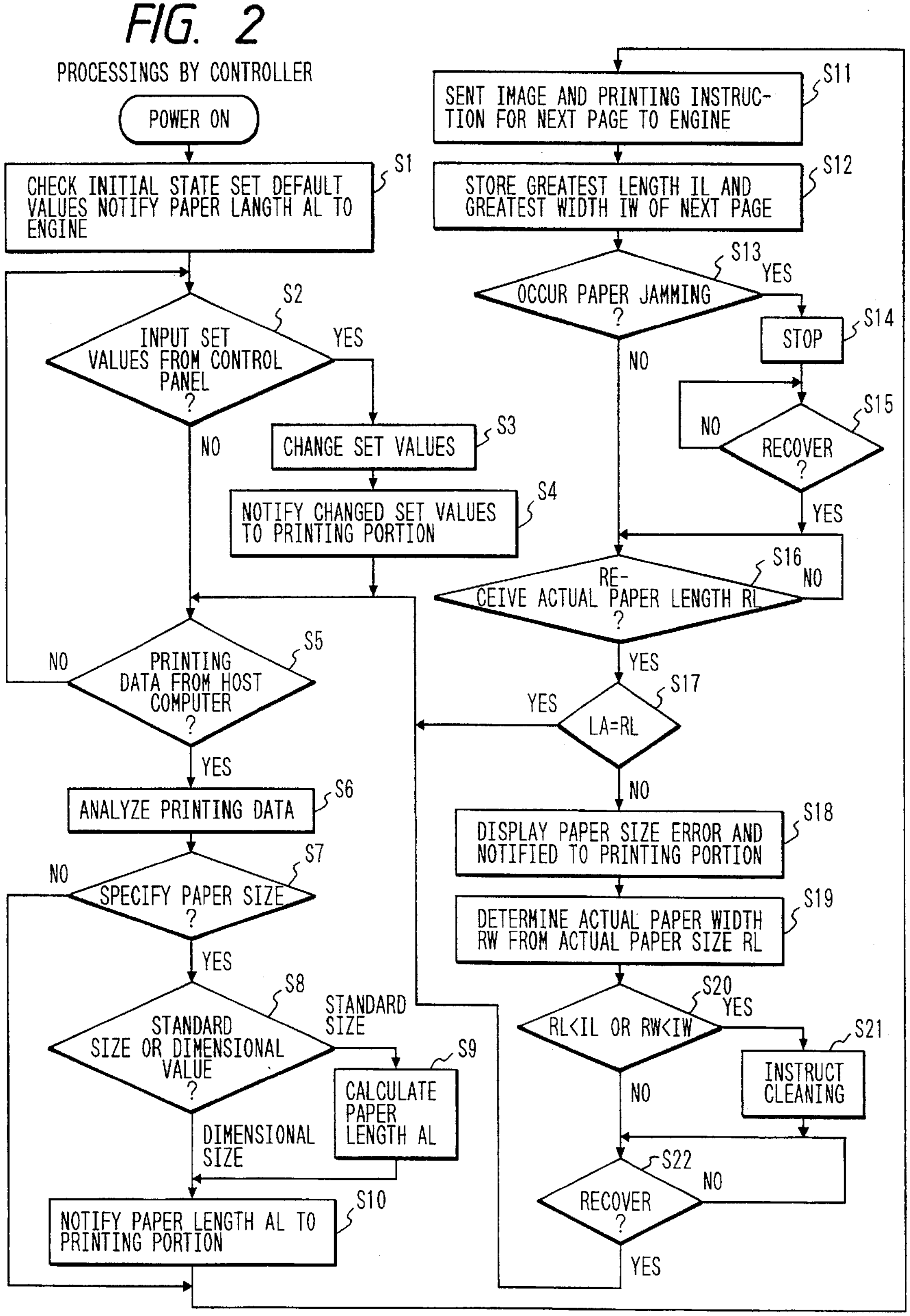
FIG. 2 is a flow chart of processings to be performed by a controller employed in the above paper printer; and, FIG. 3 is a flow chart of processings to be performed by a printing portion employed in the above paper printer.
Figure 3:
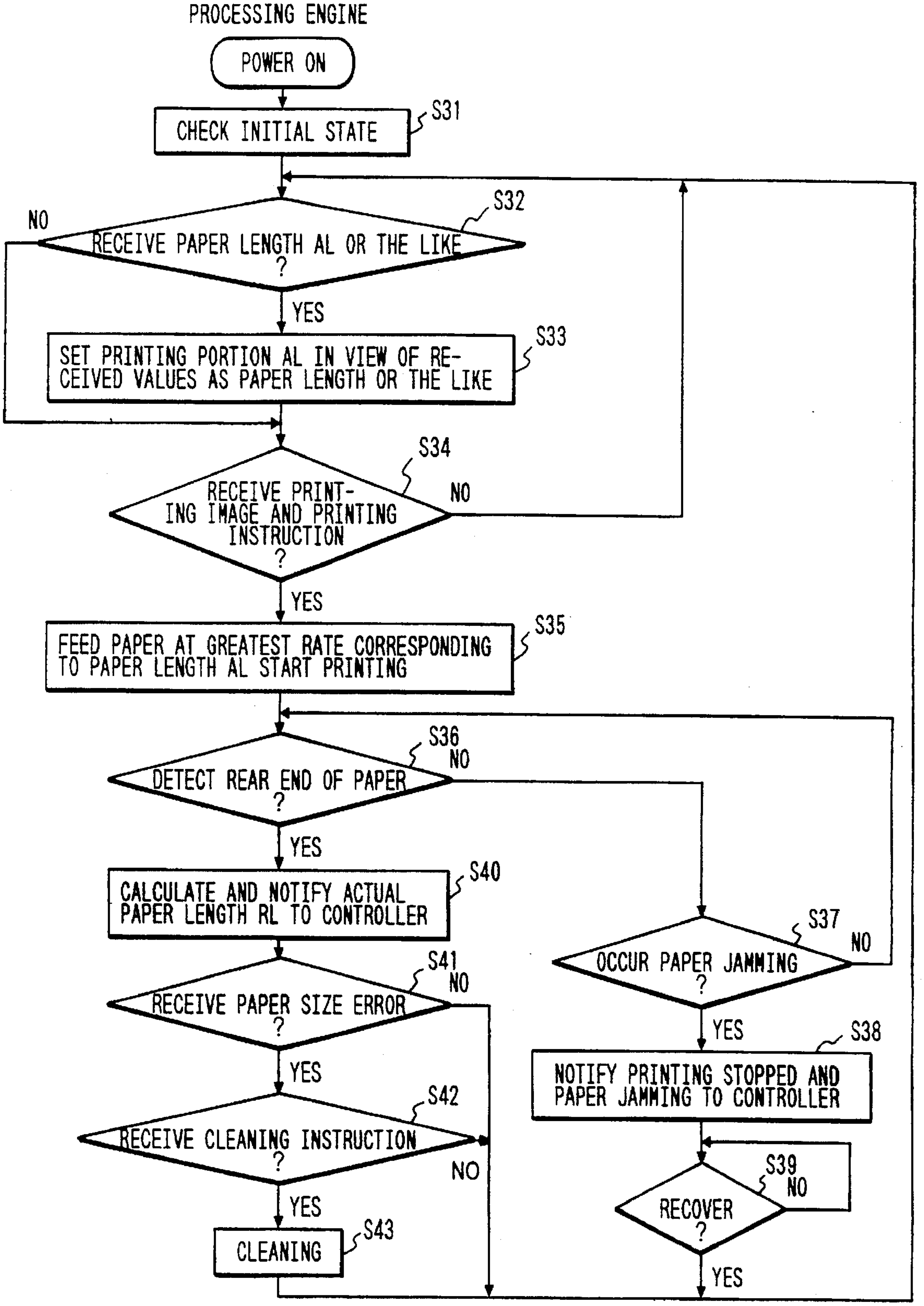

Now, FIGS. 2 and 3 respectively show the flow of the processing steps to be performed by the controller 7 and printing portion 11 in the present printer 3, mainly focusing on the processing steps in connection with the paper feeding.

At first, description will be given below of the processing steps by the controller 7 with reference to FIG. 2.

When the power supply is turned on, firstly, the interiors and peripheral portions of the controller 7 are checked for the initial states thereof and, if no problem is identified, there are set default values which have been previously programmed based on various configurations including selection of the paper size (S1). Among the configurations and statuses, as for one or more given items necessary to be sent to the printing portion 11, the respective set values thereof are sent to the printing portion 11 (S1). The paper size is one of the items to be notified to the printing portion 11. Referring to the paper size, even if the default value thereof specifies a given size number such as "A4", the dimensional value AL of the paper extending along the paper feeding direction (which is referred hereinafter to as paper length) is stored as a set value in the controller 7 and also the paper length AL is notified to the printing portion 11.

Next, the controller 7 enters a wait state in which the set values and the like are input from the control panel and data are received from the host (S2, S5). In this state, if a different size relating to the paper size is input from the control panel, then the set value of the paper size is changed in accordance with the different size (S3) and, at the same time, the changed paper size is notified to the printing portion 11 (S4) and processing continues with step S5. In this case as well, even if a standard size such as "B5" or the like is input from the control panel, the controller 7 not only converts the standard size into the paper length AL and stores the paper length AL as a set value but also notifies the printing portion 11 of the paper length AL. If, in step S2, no input is set from the control panel, processing continues with step S5. If, in step S5, no printing data is received from the host, processing continues with step S2.

Also, in the above-mentioned wait state, if the controller 7 receives data from the host, then the controller 7 starts to perform printing processing based on the received data. In this printing processing, at first, the controller 7 analyzes the received data corresponding to one page (S6). If the specification of the paper size is included in the received data (S7), then the controller 7 checks whether the specification indicates any one of the standard sizes or a freely set dimensional value (S8). If it shows a given standard size, then the controller 7 calculates a paper length AL corresponding to the standard size (S9) and proceeds to step S10 (described below). On the other hand, if it shows a dimensional value, the controller 7 extracts a paper length AL from the dimensional value, and stores the paper length AL and notifies the printing portion 11 of the paper length AL (S10).

Next, in accordance with the analysis results of the received data, the controller produces a printing image for the next page following the currently printing page and also generates control instructions necessary for the printing of the next page, and transmits both of them to the printing portion 11 (S11). At that time, the controller 7 stores therein not only the greatest length IL of the printing image at the next page in the paper feeding direction thereof but also the greatest width IW of the same printing image in a direction perpendicular to the paper feeding direction thereof (S12).

Next, the controller checks whether any notice of a paper jamming occurrence has been received from the printing portion 11 (S13).

When the paper jamming notice has arrived, the controller 7 provisionally stops (S14) its processings. Thereafter, if the jammed paper is removed by a user and the control panel inputs a message to the effect that the paper jamming is recovered (S15), then the controller 7 resumes its provisionally stopped processings. Until recovery, the processing waits (i.e., "NO" path is taken). When no paper jamming occurs but printing is carried out normally in the printing portion 11, or when, even if paper jamming occurred, the paper jamming has been recovered and normal printing has been carried out again, the printing portion 11 notifies the controller 7 of the actual length (which is hereinafter referred to as the actual paper length) RL of the thus printed paper in the paper feeding direction thereof (S16). Until this happens, processing waits (i.e., "NO" path is taken).

Upon receiving the actual paper length RL, the controller 7 compares the actual paper length RL with the paper length AL previously specified by the control panel or host (S17). If the comparison shows that the paper length AL is substantially equal to the actual paper length RL (that is, RL is in a given variation range in which a variation in the paper dimension is taken into account with respect to AL), then the controller 7 judges that printing has been carried out on the paper of a specified size and thus returns to Step S5, and advances to a printing processing of the following page. On the other hand, if AL and RL do not substantially coincide with each other, then the controller 7 judges it as a paper size error, so that the controller 7 not only displays an error on the control panel but also notifies the printing portion 11 of the paper size error (S18).

In the case of the paper size error, the controller 7 determines the actual width RW of the paper from the actual paper length RL (S19). As a determining method, for example, there can be employed a method in which the actual length RL is collated with the length and width dimensions of a previously programmed standard size to thereby determine to which standard size the actual paper corresponds, and the width dimension of the corresponding standard size (that is, one of the above length and width dimensions, the other dimension than the dimension identical with the actual paper length RL) is considered as the actual width RW. Here, when the paper used is of a non-standard size, standard sizes respectively having a dimension approximate to the actual paper length RL are chosen as possible candidates, and one of the candidate standard sizes that has the greatest width dimension is selected as the actual paper width RW.

Also, as an alternative method of obtaining the actual paper width RW, the actual paper width RW may be measured in the printing portion 11 and then the printing portion 11 may notify the controller 7 of the measured actual paper width RW.

Next, the thus obtained actual paper length RL and width RW are compared with the greatest length IL and width IW of the image printed on the paper (S20). If the comparison result shows that $RL<IL$ or $RW<IW$, then the controller 7 judges that the printed image extends beyond the paper and thus instructs the printing portion 11 on the execution of a cleaning operation (S21). On the other hand, if it is found that the printed image is dimensioned to be smaller than the paper, then the controller 7 does not issue the cleaning instruction since no cleaning is necessary (S22).

Thereafter, if paper of a correct size is set by a user and a recovery message is input from the control panel, then the controller 7 returns to Step S5 and advances to a printing processing on the following page (i.e., "YES" path of S22). Until this happens, processing waits (i.e., "NO" path of S22 is taken).

Next, description will be given below of the processings to be performed by the printing portion 11 with reference to FIG. 3.

If the power supply is turned on, the interiors and peripheral portions of the printing portion 11 are checked for the initial states thereof (S31). If no problem is found, then if the printing portion 11 receives set values such as the paper length AL and the like from the controller 7 (S32), the printing portion 11 is set to the state thereof that is proper for the set values received ("YES" path of S32 to S33). For example, for the paper length AL received, the timing of the paper feeding is set so that the paper can be fed at the greatest rate corresponding to the paper length AL, and the upper limit value of the paper feeding time for paper jamming detection is also set to the value that is proper for the paper length AL. If not, processing continues via "NO" path of S32 to S34.

Next, the printing portion 11 enters a wait state in which it receives a printing image and a control instruction for printing from the controller 7 (S34). Until this is received, the wait continues via "NO" path of S34. When the printing portion 11 receives the printing image and control instruction, it starts to feed the paper at the greatest rate corresponding to the previously set paper length AL and, at the same time, prints the printing image on the paper (S35). Until the rear end of the paper is detected, processing passes from S36 to S37. Unless a jam has occurred, processing goes back from S37 to S36. In this manner, the printing portion 11 checks whether any paper jamming has occurred during the paper feeding (S36, S37). In particular, the paper feeding is not completed even when the paper feeding time exceeds the paper feeding upper limit value appropriate for the paper length AL, then the printing portion 11 judges that the paper jamming has occurred, and thus provisionally stops the paper feeding and printing operations and notifies the controller 7 of the paper jamming (S38). Thereafter, if the printing portion 11 receives a recovery message from the controller 7 (S39), it returns to the state thereof just after the initial check (S31). Until this happens, processing waits at S39.

In this process, each time it detects that the rear end portion of the paper is being fed (S36), it calculates the actual length RL of the paper fed and notifies the controller 7 of the calculated actual paper length RL (S40). Here, the actual paper length RL can be calculated from not only the time during which a paper sensor (not shown) provided in the printing portion 11 senses the paper but also the speed of the paper feeding.

Next, the printing portion 11 checks whether it receives the notice of the paper size error from the controller 7 (S41) and, if no paper size error is found, then the printing portion 11 returns to Step S32, where it feeds the following paper and prints an image on this paper. On the other hand, if the paper size error is found, then the printing portion 11 checks whether a cleaning instruction is transmitted from the controller 7 (S42). Additionally, if the printing portion 11 receives the cleaning instruction, it performs a cleaning operation on the transfer drum 17 (S43) and, after completion of the cleaning operation, it returns to Step S32 where it resumes its processings on the following paper.

As has been described heretofore, according to the present embodiment, the controller 7 notifies the printing portion 11 of the specified paper length, the printing portion 11 sends back the length of the actually fed paper to the controller 7, and the controller 7 checks the paper size error for the presence or absence thereof. Accordingly, there is eliminated the need for the printing portion 11 to be informed of the standard size of the paper like the conventional method, with the result that the paper size can be specified freely. In addition to this, when compared with the conventional method, there is also eliminated the problem in design that the operation program of the printing portion 11 and the video interface must be changed when the usable standard size is changed.

Also, since the printing portion 11 is arranged such that it feeds the paper from the first page at the greatest rate in accordance with the paper size notified by the controller 7, the printing speed can be enhanced. Further, due to the fact that the cleaning operation is performed only when the paper size error occurs and the printed image extends beyond the paper, unnecessary cleaning operations can be avoided and thus the printing speed can be further improved.

Moreover, because the upper limit value of the paper feeding time for paper jamming detection is set from the first page in accordance with the paper size notified by the controller 7, the paper jamming can be detected quickly and thus the printing portion 11 can be stopped early.

Even if the paper feeding is controlled from the beginning in accordance with the paper size informed by the controller 7, there arises no special practical problem partly because there is actually a quite low probability that paper of a different size can be set, and partly because, even if the paper of a different size is set, the paper size error can be detected at the time when a sheet of paper is fed. When there is set paper having a size which is much larger than the specified paper size, there may be a possibility that paper jamming may be falsely detected during the paper feeding. However, since this is the actually a paper size error, paper of a correct size must be reset. That is, this cannot provide a practically special problem.

Also, due to the fact that checking for the paper size error is carried out only by the controller 7 and the printing portion 11 can be stopped by an instruction from the controller 7, a system in which printing must be always stopped whenever the paper size error occurs as in the above-mentioned embodiment can be changed into another system in which, when the printing image is printed on paper larger in size than the printing image, printing is not stopped but is allowed to continue, only by changing the program of the controller 7. Additionally, it is also possible for a user to select one of the systems for treating the paper size error arbitrarily. In this case, the image can also be printed on paper of a special size or of irregular sizes prepared by the user. This is convenient, for example, in a case in which the size of the paper does not matter provided that a manuscript is printed completely, or in a case in which it is desirable that printing is executed on paper of an unusual size on purpose.

Here, the present invention is not limited to the illustrated embodiment but other various modifications are possible without departing from the subject matter of the present invention.

What is claimed is:

1. A paper feed control system in a printing unit using cut sheets of paper, each having a respective actual length, said system comprising:

a controller for receiving data necessary for printing from a host computer, and for analyzing said received data to provide analyzed results thereof, said analyzed results including a calculated paper length and image data, a printing portion for receiving said analyzed results, for feeding one of said cut sheets of paper, and for printing thereon an image in accordance with said image data, and a video interface for interfacing between said controller and said printing portion;

wherein said controller includes:

calculation means for calculating said calculated paper length based on a specified paper size from said received data, and notifying means for notifying said printing portion of said calculated paper length; and wherein said printing portion includes executing means for executing said feeding of said cut sheets of paper, and assumes, for purposes of detecting a first sheet paper jam, that a first one of said cut sheets of paper has said calculated paper length as said respective actual length thereof.

2. A paper feed control system of claim 1, wherein:

said printing portion includes:

measuring means for measuring said respective actual paper length, and instructing means for instructing said controller of said respective actual paper length; and said controller includes judging means for judging, in accordance with said respective actual paper length, whether there is present any paper size error based on a difference between said respective actual paper length and said calculated paper length.

3. The paper feed control system as set forth in claim 2, wherein;

said control system supports three specifications without modification to said video interface and without modification to said printing portion; and said three specifications are:

a first specification in which said judging means judges that there is no said paper size error regardless of said difference between said respective actual paper length and said calculated paper length;

a second specification in which said judging means judges that there is said paper size error only when said difference between said respective actual paper length and said calculated paper length indicates that said respective actual paper length is less than said calculated paper length; and a third specification in which said judging means judges that there is said paper size error whenever there is said difference between said respective actual paper length and said calculated paper length.

4. A paper feed control system according to claim 2, wherein:

said cut sheets of paper each have a respective actual width;

said calculating means also calculates, based on said image data, a greatest image length and a greatest image width of a printing image formed on a transfer mechanism of said printing portion;

said printing portion further comprises determining means for determining said respective actual paper width of said one of said cut sheets of paper on which said printing image is printed;

said controller further comprises comparing means for respectively comparing said greatest image length and said greatest image width with said respective actual paper length and said respective actual paper width thereby to determine whether said printing image extends beyond said paper; and said printing portion further comprises cleaning means for cleaning said transfer mechanism when said comparing means determines that said printing image extends beyond said paper, and not cleaning said transfer mechanism when said comparing means determines that said printing image does not extend beyond said paper.

5. A paper feed control system according to claim 4, wherein said determining means assumes said respective actual paper width in accordance with said respective actual paper length.

6. A transfer mechanism cleaning control system in a page printer according to claim 4, wherein said comparing means performs said determination only when said paper size error is detected.

* * * * *